United States Patent [19]

Satomi et al.

[11] Patent Number: 5,134,653
[45] Date of Patent: Jul. 28, 1992

[54] AUTOMATIC DIALING MACHINE

[75] Inventors: Mitsuo Satomi, Kyoto; Kazuaki Oshita, Hirakata; Tetsuya Kuwahara, Takashima, all of Japan

[73] Assignee: Murata Kikai Kabushiki Kaisha, Kyoto, Japan

[21] Appl. No.: 485,999

[22] Filed: Feb. 27, 1990

[30] Foreign Application Priority Data

Mar. 1, 1989 [JP] Japan .................... 1-23720

[51] Int. Cl.$^5$ ............................ H04M 1/26
[52] U.S. Cl. .................... 379/355; 379/354; 379/142
[58] Field of Search ............ 379/354, 142, 355, 356, 379/396, 100

[56] References Cited

U.S. PATENT DOCUMENTS

| 4,029,559 | 5/1989 | Izawa et al. | 379/100 X |
| 4,709,387 | 11/1987 | Masuda | 379/354 |
| 4,825,464 | 4/1989 | Wen | 379/354 |

FOREIGN PATENT DOCUMENTS 0129759 6/1988 Japan ................... 379/354

OTHER PUBLICATIONS

B. A. Pargh Company Inc., 1985, p. 251 "GTE, Gamma Phone."

*Primary Examiner*—James L. Dwyer
*Assistant Examiner*—M. Shehata
*Attorney, Agent, or Firm*—Spensley, Horn, Jubas & Lubitz

[57] ABSTRACT

An automatic dialing machine adapted to a facsimile machine having a telephone function comprises: a device for displaying an input number; a memory for storing part of telephone number and a coded number corresponding thereto; a speed dial key for inputing the coded number; a ten-key set for inputing a non-coded number; and a controller for displaying on the display device the coded number and non-coded number in turn and in series as they are input respectively from the speed dial key and ten-key set and further for performing a real-phone-number-dialing based on the displayed in-series number.

6 Claims, 7 Drawing Sheets

| TWO TOUCH SPEE DIAL NO. (ij) | NAME | REAL PHONE NUMBER |
|---|---|---|
| (01) | ABC BANK | 06-123-4567 |
| (02) | ABC MACHINERY | 075-111-2222 |
| (03) | ABC COMMERCIAL CO. | 03-444-5555 |
| (04) | AREA CODE | 06 |
| (05) | EXCHANGE CODE | 123 |
| (06) | LAST FOUR DIGITS | 0661 |
| (07) | -------------------- | -------------- |
| ..... | -------------------- | -------------- |

FIG. 2

| ONE-TOUCH KEY NO. [nm] | NAME | REAL PHONE NUMBER |
|---|---|---|
| [01] | | 075 |
| [02] | | 4214 |
| ..... | -------------------- | -------------- |

FIG. 3

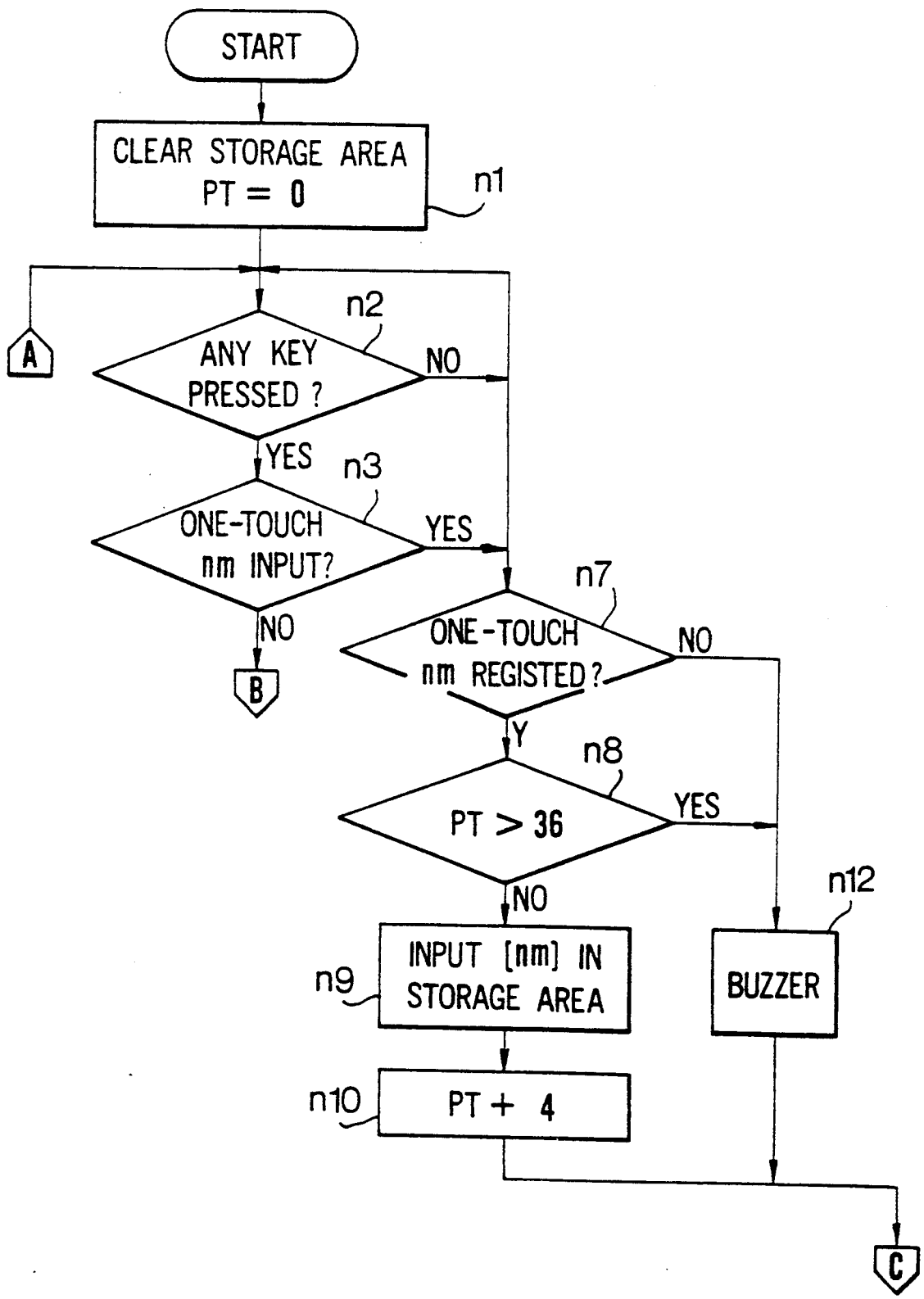
FIG. 4 (1)

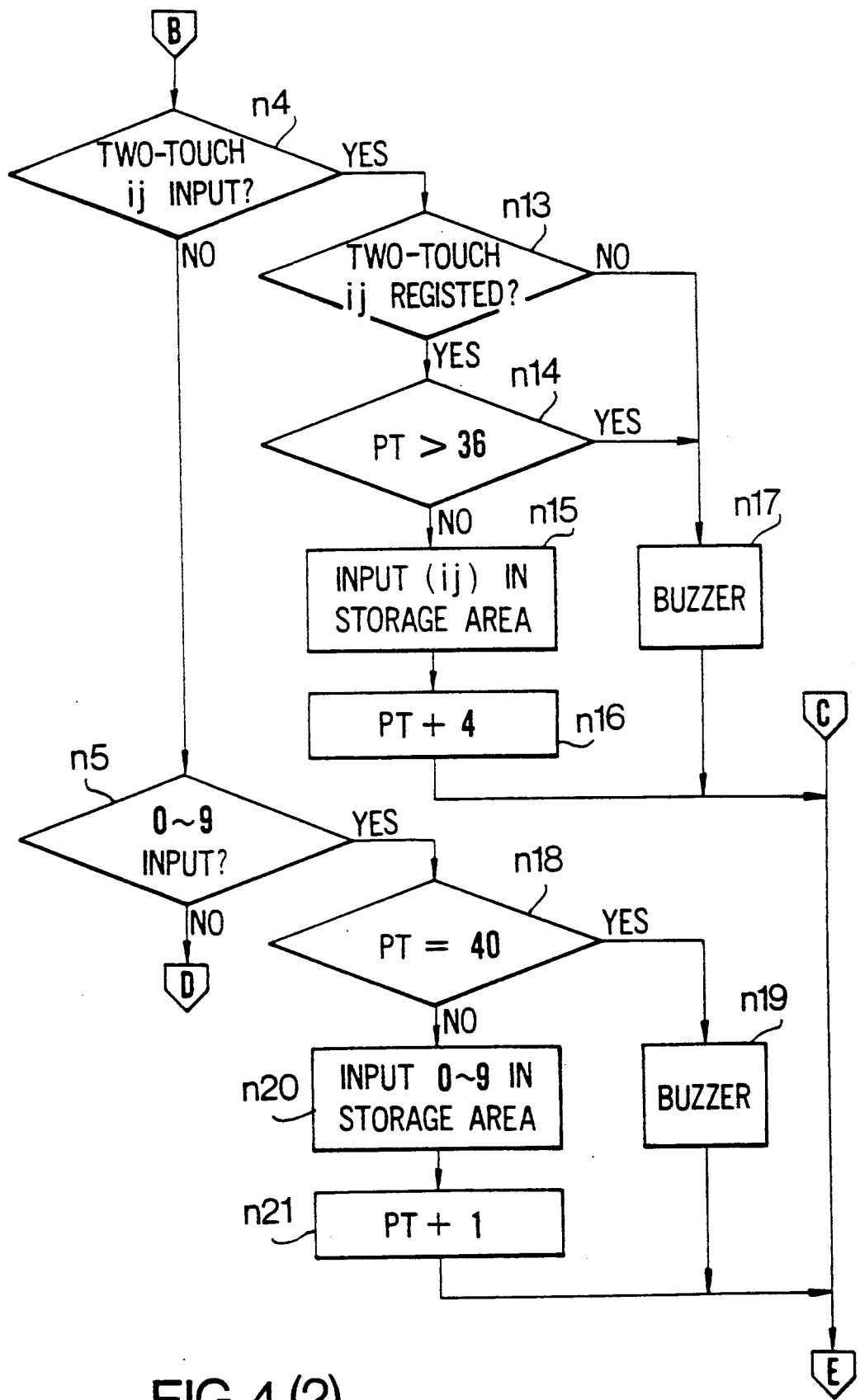
FIG. 4 (2)

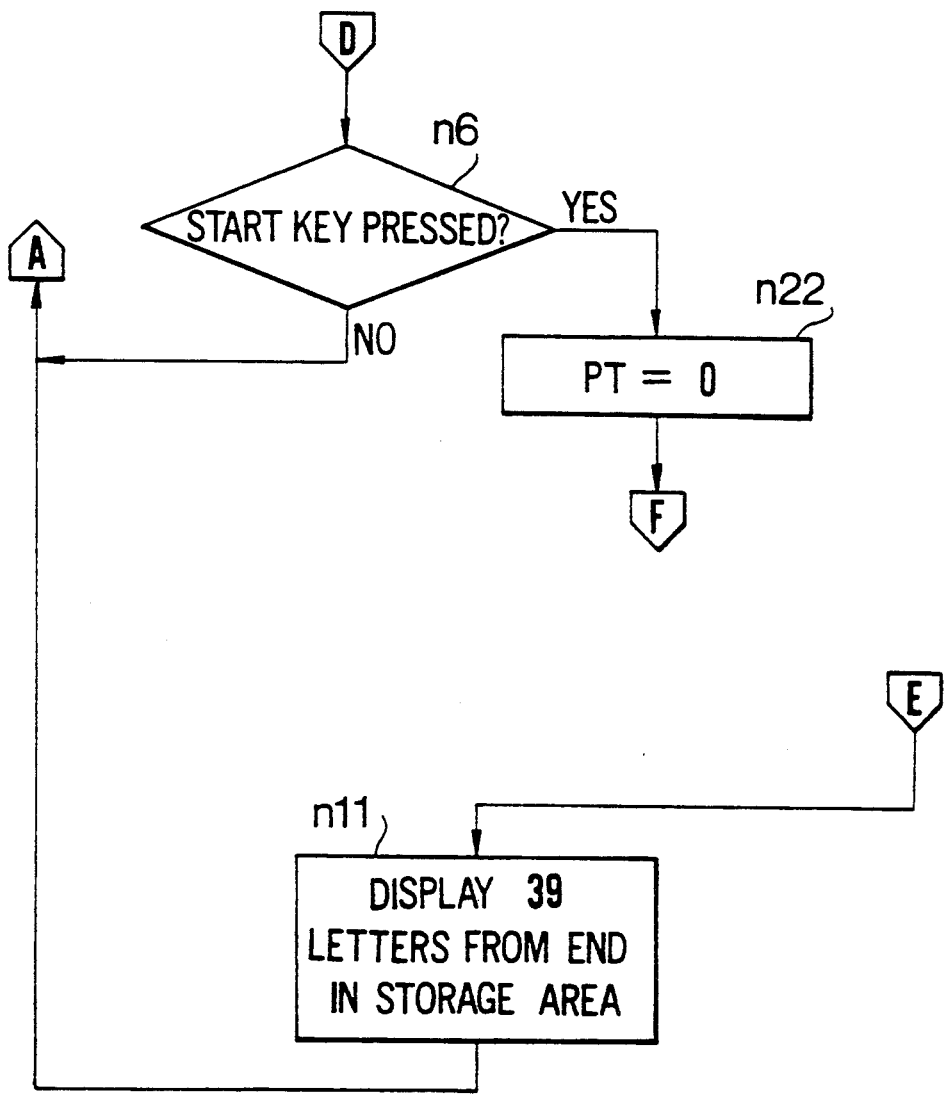
FIG. 4 (3)

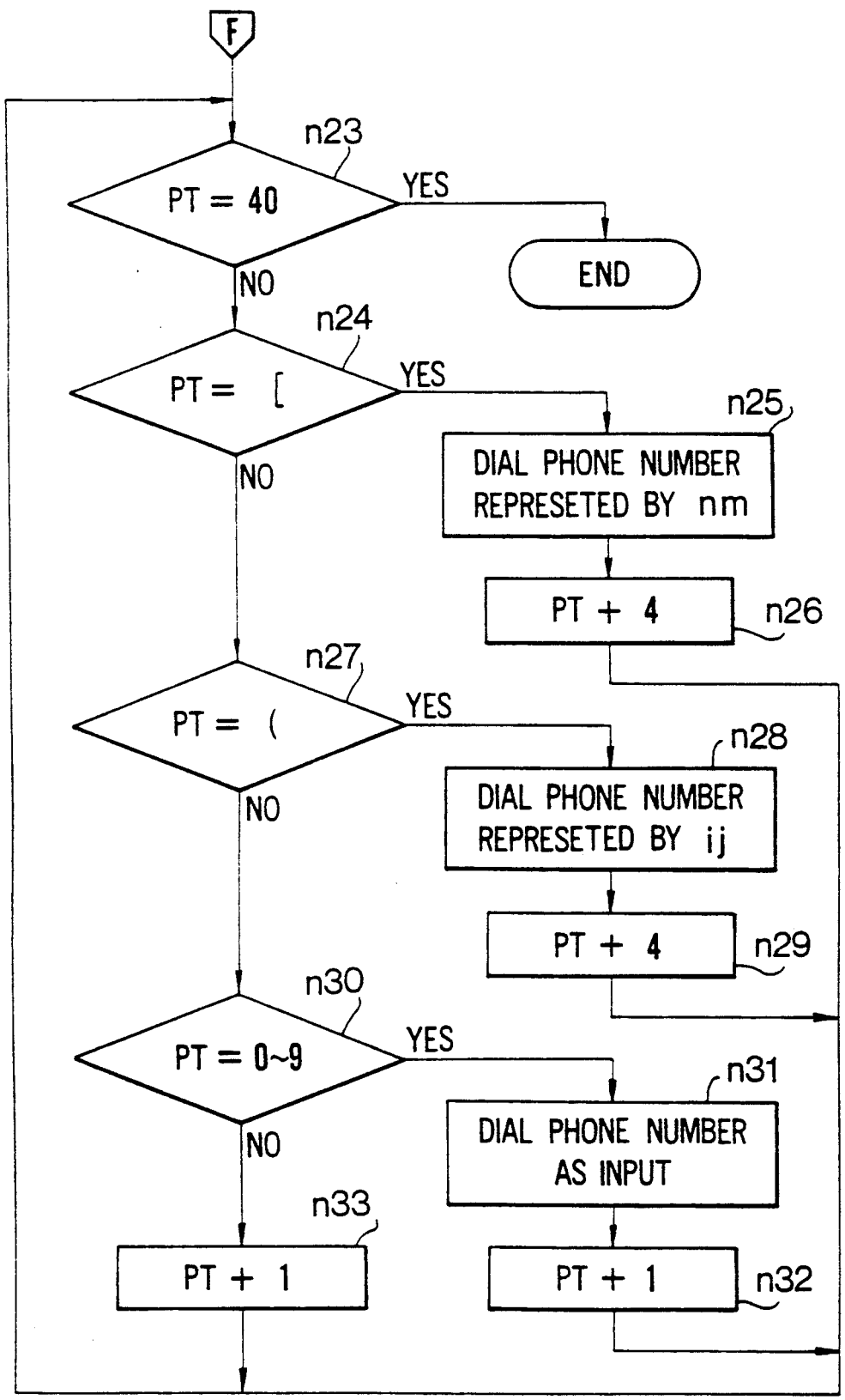
FIG. 4 (4)

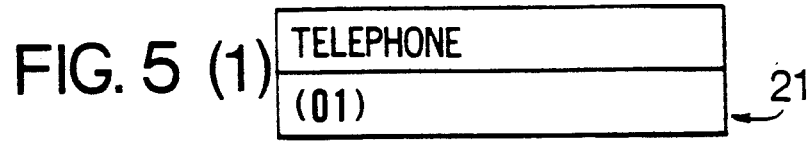
FIG. 5 (1)
FIG. 5 (2)
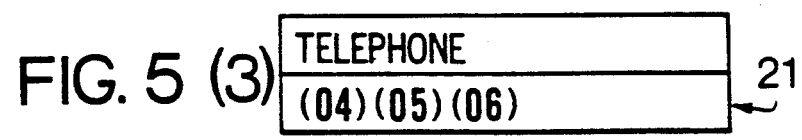
FIG. 5 (3)
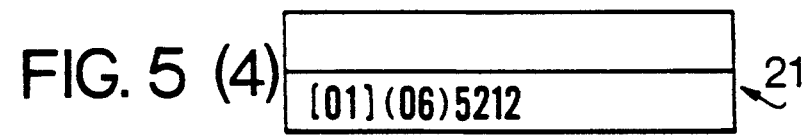
FIG. 5 (4)
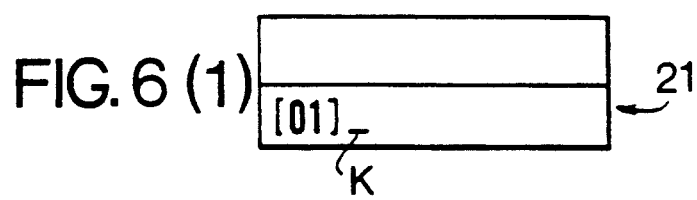
FIG. 6 (1)
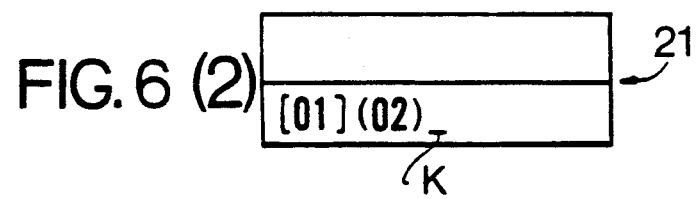
FIG. 6 (2)
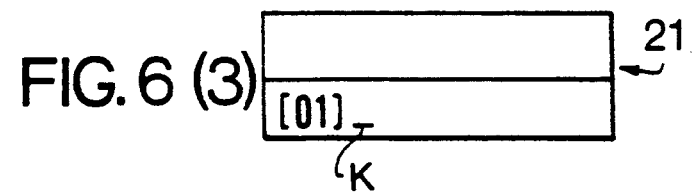
FIG. 6 (3)
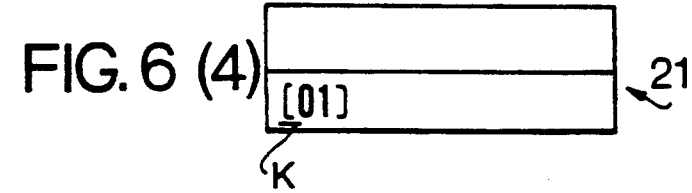
FIG. 6 (4)
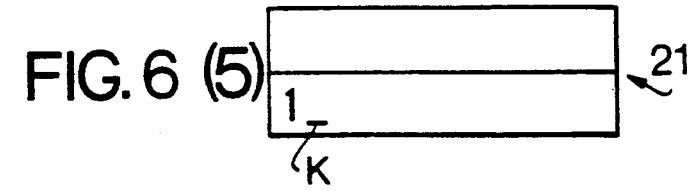
FIG. 6 (5)

AUTOMATIC DIALING MACHINE

BACKGROUND OF THE INVENTION

1. Technical Field

The present invention relates to an automatic dialing machine adapted to a facsimile machine having a telephone function.

2. Background Art

When a conventional facsimile machine having a telephone function is used as a telephone, first a telephone receiver has to be picked up or a certain key of the facsimile machine (a hook key, for example) has to be pressed to connect itself to a telephone line and then other particular keys of the facsimile machine have to be pressed to input the telephone number in order to instruct the telephone number to an exchange. After that, a network control unit (called "NCU" hereinafter) is operated and the telephone number appears on an indicating device of the facsimile machine.

Meanwhile, telephone services play important and complicated role in today's society and the telephone number tends to have more digits than before. When such a long telephone number is input into the conventional facsimile machine, the telephone number "overflows" from the number indicator of the facsimile machine. This is called digit overflow. Also, it is troublesome to input a long number by a ten-key set of the facsimile machine and a dialing error easily occurs.

Thereupon, developed was an automatic dialing machine which possesses a reduced coded dialing system. In this type of automatic dialing machine, a reduced coded number, which corresponds to a real telephone number, is registered beforehand and an operator just inputs the reduced coded number using a ten-key set or a so-called one-touch key, instead of dialing or pressing all the numerals of the real telephone number.

In summary, the conventional dialing machines are generally categorized into three types: real telephone number input type; one-touch speed dial type; and two-touch speed dial type or two-digit speed dial type. Each numeral of the telephone number has to be pressed by the operator with the ten-key set in the first type. A one-touch speed dial key corresponding to one coded number is pressed to start dialing in the second type. The reduced coded numbers are input by the ten-key set after the facsimile machine is switched to a two-touch speed dial mode to make a call in the third type. When the operator uses the one-touch or two-touch speed dial type, a real telephone number which may have a large number of digits has to be stored in a memory of the facsimile machine before enjoying such functions. However, the memory of the conventional facsimile machine only possesses a limited capacity so that a lot of long telephone numbers cannot be stored. In other words, a large capacity of memory is required.

Furthermore, the conventional automatic dialing machine has a drawback that the telephone number indicator has only limited space to display the number and therefore it cannot display a long telephone number. When such a long number is input, all the digits of the telephone number are not displayed, i.e., the digit overflow occurs.

SUMMARY OF THE INVENTION

One object of the present invention is to provide an automatic dialing machine which is able to eliminate the above-mentioned problems of the prior art arrangement.

Another object of the present invention is to provide an automatic dialing machine to which a plurality of short coded numbers and non-coded numbers are arbitrarily input.

Still another object is to provide an automatic dialing machine which is able to display the short coded numbers and the non-coded numbers in series and in turn as they are input.

According to one aspect of the present invention, there is provided an automatic dialing machine which comprises: means for displaying a number input; means for memorizing a part of real telephone number and a coded number corresponding to the part of the telephone number; means for inputing the coded number; means for inputing another part of the real telephone number; and a control means for displaying on the display means the coded number and non-coded real phone number in turn and in series as they are input respectively from the coded number input means and real phone number input means and further for performing a real-phone-number-dialing based on the displayed in-series number.

With a machine having the above-mentioned elements, a plurality of short coded numbers are input in the machine in one case and a plurality of coded numbers and non-coded numbers are input in the machine in another case. The coded numbers and non-coded numbers are displayed in turn and in series as they are input and a dialing starts based on the displayed numbers. This function improves the serviceability of the machine. Also, even if the real phone number has a large number of digits, there is no possibility of digit-overflow since the phone number can be displayed by the coded numbers. In addition, the machine does not require a large capacity of memory in storing a long-digit-number since all the numerals of the phone number does not have to be stored in the memory of the machine and the phone number can be divided into three groups, for example, and stored separately.

BRIEF DESCRIPTION OF THE DRAWINGS

FIG. 2 shows a two-touch speed dial memory of the automatic dialing machine;

FIG. 3 shows a one-touch speed dial memory;

FIGS. 4(1)-4(4) are a set of views showing flowchart of phone number input operation and display operation;

FIGS. 5(1)-5(4) illustrates display on an indicator of the automatic dialing machine according to one embodiment of the present invention; and FIGS. 6(1)-6(5) illustrates display according to another embodiment of the present invention.

DESCRIPTION OF THE PREFERRED EMBODIMENTS

Figure 1:
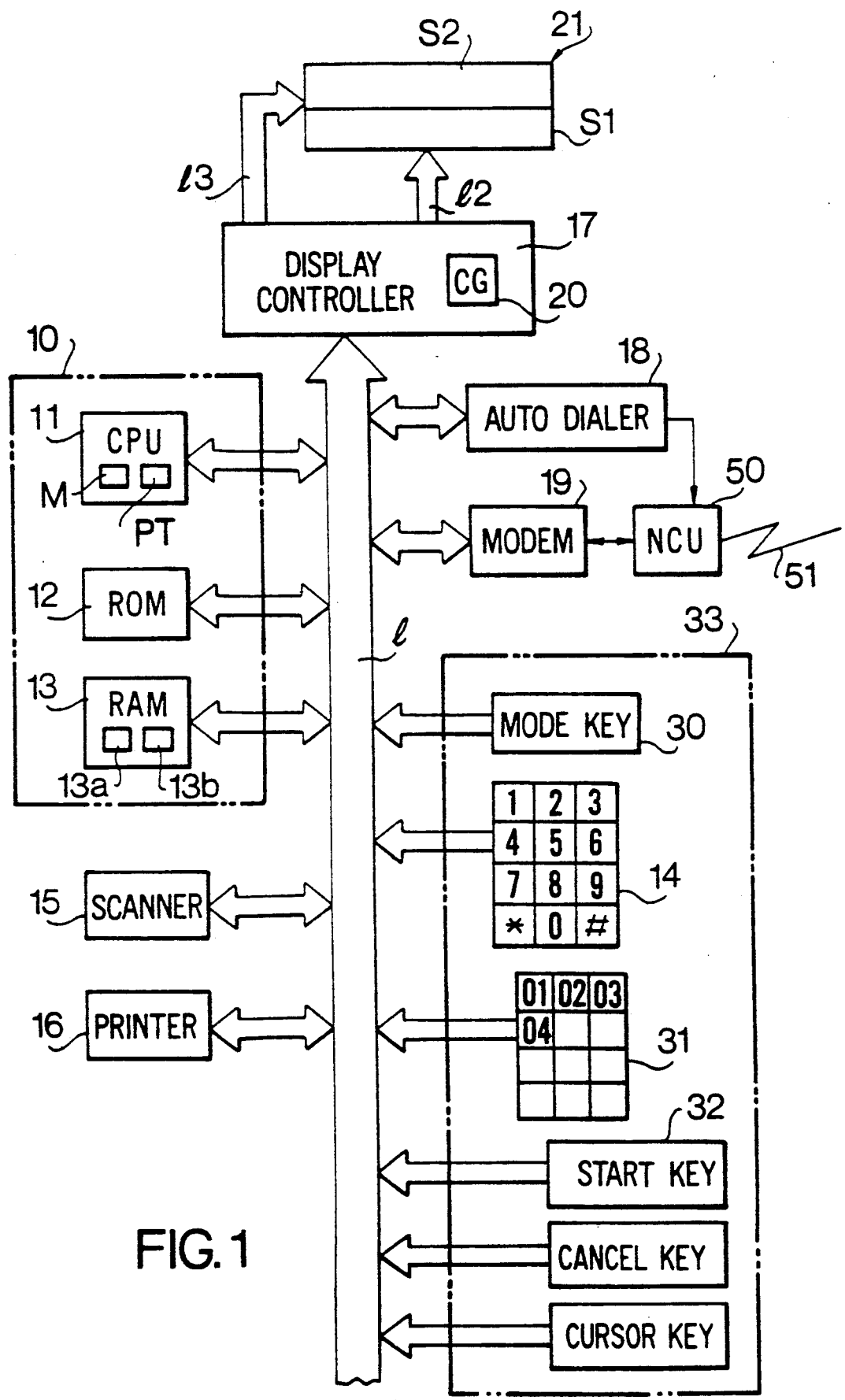
FIG. 1 shows a block diagram of a facsimile machine having a telephone function provided with an automatic dialing machine of the present invention.

FIG. 1 illustrates a block diagram of one embodiment of the telephone-installed facsilime machine having an automatic dialing machine according to the present invention. In the illustration, numeral 10 designates a control part, in which there are provided a CPU 11, a ROM 12 including system programs and a RAM 13. The RAM 13 includes a two-touch or two-digit speed dial memory 13a and a one-touch speed dial memory 13b. The two-touch speed dial memory 13a memorizes the short coded numbers, names and real phone numbers in a manner such that the coded numbers, names and real telephone numbers correspond to each other, as shown in FIG. 2. Likewise, the one-touch speed dial memory 13b memorizes the short coded numbers, names and real phone numbers in a manner such that they correspond to each other, as shown in FIG. 3. In FIG. 2, ( ) are symbols for the coded number for the two-touch speed dial system, and the number ij (two-touch number) is displayed as (ij) in the indicator 21. In FIG. 3, [ ] are symbols for the coded number for the one-touch speed dial system and the number nm (one-touch number) is displayed as [nm] in the indicator 21.

Referring back to FIG. 1, the ROM 12 and RAM 13 are connected to the CPU 11 via a common bus line 1. Also, various groups of keys 33, a scanner 15 reading a manuscript note, a printer 16 printing an image sent, a display controller 17, an auto-dialer 18 and a modem 19 are respectively and separately connected to the CPU 11 via the same bus line 1. The key input means 33 includes a ten-key set 14, a two-touch speed dial mode key 30 (called "mode key" hereinafter), a one-touch key 31, a start key 32 starting dialing. The one-touch-key is a key which represents one entire real phone number or a part of it. Therefore, pressing a certain one-touch-key 31 means dialing a corresponding real phone number.

A character generator 20 is provided in the display controller 17. Characters to be displayed on the liquid crystal type indicator 21 is controlled by the controller 17. The liquid crystal indicator 21 includes a first indicator S1 for displaying a phone number of a party to be called and a second indicator S2 provided above the first indicator S1 for displaying a telephone message such as a name of a party who has made a call. In this embodiment, the first indicator and second indicator can display twenty characters, respectively. When a character is displayed on the liquid crystal indicator 21, the CPU 11 sends instructions to the controller 17 on a character code, position of the character, presence of the cursor and position of the cursor. Thereupon, the display controller 17 develops the character in a dot patern by the character generator 20 and outputs to the liquid crystal indicator 21 via the lines 12 and 13 control signals corresponding to bits of the liquid crystal indicator 21. In this manner, characters are displayed on the first and second indicators S1 and S2 of the liquid crystal indicator 21. Meantime, numeral 50 denotes an NCU which controls a line 51.

FIG. 4 illustrates a flowchart to show a process as a telephone number is input using a facsimile machine. First, a storage area M (FIG. 1) is cleared and a storage point PT (FIG. 1) is made zero at the step n1. Then, it is judged whether any key of the auto dialing machine is pressed or not at the step n2. When the answer is YES at the step n2, the program proceeds to the step n3 and it is judged whether the one-touch key 31 is pressed or not. When the answer is NO at the step n3, the program proceeds to the step n4 and it is judged whether the two-touch number is input or not. When the answer is NO at the step n4, the program proceeds to the step n5 at which it is checked if one of the ten keys "0" to "9" is pressed. When the answer is NO at the step n5, the program advances to the step n6 at which it is checked if the start key 32 is pressed. When the answer is NO at the step n6, the program returns to the step n2.

When the one-touch key 31 is pressed, the program jumps from the step n3 to the step n7. In a case where the one-touch key 31 produces a number nm, the step n7 judges if the number nm is a registered number, and when it is the registered number, the step n8 is executed to judge if a value of the storage point PT is larger than 36. This is because the total digit capacity of the indicators S1 and S2 is forty (twenty for each) and because four digits are necessary to display a coded number enclosed in square bracktes [nm] when the one-touch key is pressed. When the answer is NO at the step n8, the step n9 is executed to input [nm] into the storage area M. Successively, +4 is added to the storage point PT at the step n10. Then, the characters input in the storage area M is displayed on the liquid crystal indicator 21.

If the number nm produced by the one-touch key at the step n7 (one-touch number) is not a registered number, the program moves on to the step n12 to activate a buzzer alarming that there has been a mis-input. Then, the program proceeds to the step n11. When the value of the storage point PT is larger than 36 at the step n8, the program proceeds to the step n12 to sound the alarm since a digit-overflow would occur if the number procuded by the one-touch key 31 was displayed.

In a case where a telephone number is input in the two-touch or two-digit speed dial mode, i.e., when the coded number ij is input by pressing the ten-key set 14 twice after the mode key 30 has been pressed, the program proceeds to the step n13 from the step n4 and it is checked whether the two-touch number ij is the registered number or not at the step n13. If the answer is NO at the step n13, the step n17 is carried out to give an alarm. If the answer is YES at the step n13, the step n14 is carried out to check whether the storage point PT is larger than 36 or not. When the value of the storage point PT is larger than 36 at the step n14, the program proceeds to the step n17 to sound the alarm. The steps n14 and n17 are necessary, like the case of the above-mentioned input process by the one-touch key, since a digit-overflow would occur if the number represented by the two-digit number, which has more than 36 digits, was displayed. When the answer is NO at the step n14, the program proceeds to the step n15 and (ij) is memorized in the storage area M, then proceeds to the step n16 and +4 is added to the storage point PT. After that, the program goes to the step n11.

In a case where the telephone number is input using the ten-key set 14, the answer at the step n5 is always YES, and the program proceeds to the step n18. The step n18 checks if the storage point PT is equal to 40. When the storage point PT is 40, which means that the entire 40 digits of the indicator 21 are already filled up and that no further number can be displayed, the step n19 is carried out to activate the buzzer. When the answer is NO at the step n18, the program proceeds to the step n20 to cause the storage area M to memorize the number input into the storage area and then to the step n21 to add +1 to the storage point PT. After the steps n10 and n21, respectively, the step n11 is carried out to display the number in the indicator 21. Thereafter, the program returns to the step n2.

As described above, the steps n2 through n21 are repeated as the input operations are performed by the one-touch speed dial key 31 and the ten-key 14 for the two-touch speed dialing and the real telephone number. Therefore, the indicator 21 displays the one-touch number or one-touch-key number (the number by the one-touch key), the two-touch number (the number by the ten-key set for the two-touch speed dialing) and the ten-key number (the number by the ten-key set for the real phone number) in turn and in series. Here, the indicator 21 displays the number from the first indicator S1, and when the first indicator S1 is filled up, i.e., when 20 digits filled up with numbers and symbols, these numbers are moved to the second indicator S2 and then next number is displayed in the first indicator S1 from the left end thereof.

When the start key 32 is pressed after the telephone number has been displayed in the indicator 21 in a manner as described above, YES is the answer at the step n6 and the program proceeds to the step n22, by which step the storage point PT is made zero. After the step n22, the step n23 is executed to check if the storage point PT is equal to 40. When the answer is NO at the step n23, the step n24 is carried out to send data in turn from the first one in the storage area M. If [ is memorized at the first address of the storage area M, the step n25 is carried out to perform a dialing based on the one-touch number nm. Then, +4 is added to the storage point PT at the step n26 before returning to the step n23.

In a case where the data memorized at the first address of the storage area M is not [ at the step n24, the program goes to the step n27 at which it is checked if the first data is (. If the answer is YES, the step n28 is carried out to perform a dialing based on the two-digit coded number enclosed in the ( ). Then, +4 is added to the storage point PT at the step n29 before returning to the step n23.

When the answer is NO at the step n27, the step n30 is performed to check if the data memorized in the first address of the storage area M is one of "0" to "9". If the answer is YES, the step n31 is performed to make a phone call by the number memorized therein. Then, +1 is added to the storage point PT at the step n32 before returning to the step n23. On the other hand, if the answer is NO at the step n30, the step n33 is performed to add +1 to the storage point PT before returning to the step n23.

Now, the operation will be explained in depth with an example. For instance, when only the two-touch coded number of 01 is input, what is displayed in the indicator 21 is (01) in the first indicator S1 and TELEPHONE in the second indicator S2, as shown in FIG. 5(1), and a dialing of 06-123-4567 (a real phone number) is performed. When 0077 is input by the ten-key set 14 and then a two-touch number 01 is input, as shown in FIG. 5(2), these numbers are displayed on the indicator 21 in turn and in series as they are input, and a dialing of 0077-06-123-4567 (a real phone number) is performed. When three two-digit numbers 040506 are input, the first indicator S1 displays (04)(05)(06), as shown in FIG. 5(3), and 06-123-0661 (a real phone number) is dialed. When the coded number 01 is input by the one-touch key, the coded number 06 is input by the mode key and ten-key set 14 and then non-coded number 5212 is input by the ten-key set 14, the first indicator S1 displays [01](06)5212, as shown in FIG. 5(4), and 075-661-5212 (a real phone number) is dialed. In this manner, it is possible to input a combined number which includes the one-touch-key number, the two-touch number, the ten-key number, and it is then possible to make a phone call of a real telephone number which the combined number corresponds to. Therefore, there is provided a facsimile machine easy to handle. Also, such a facsimile machine does not have to possess an indicator having a large number of digits since a long telephone number can be reduced into the coded numbers, which reduces a possibility of dialing error. In addition, since it is possible to divide the long telephone number into an area code, an exchange number and a last-four-digit number and respectively register these numbers in the form of a coded number such as the one-touch-key number, the serviceability of the machine is improved and the machine does not require a memory of large capacity.

In the above-explained embodiment, the dialing starts upon pressing the start key 32. However, the present invention is not limited to such an example. For instance, in a case where a manuscript note is set in the facsimile machine, the dialing may start upon pressing the one-touch key. Specifically, where the manuscript note is set in the facsimile machine and the ten-key number and the two-touch number are already displayed, the dialing starts as the one-touch key is pressed. In this case, the dialing is carried out based on the ten-key number, the two-touch number the one-touch-key number.

FIG. 6 illustrates another mode of display according to the present invention. Specifically, if the facsimile machine possesses a cancel key and a cursor key, an edition shown in FIG. 6 is possible. When the one-touch key 01 is pressed, the first indicator S1 displays [01]_, as shown in FIG. 6(1). In FIG. 6, K represents a cursor. When the two-touch number 02 is input after that, the indicator S1 displays [01](02)_, as shown in FIG. 6(2). Here, if the one-touch-key number and the two-touch number are incorrectly input, the cursor key is manipulated to move the cursor K below the first symbol of the incorrectly input number. Then, the cancel key is pressed to delete the number. In order to cancel the two-touch number (02), for example, the cursor K is moved under the (, which is the first letter on the display, and the cancel key is pressed. The resulting display is shown in FIG. 6(3). If the one-touch-key number 01 is then deleted, the cursor K is moved under the first letter [ of the display as shown in FIG. 6(4), and the cancel key is pressed. At this point, there is no letter in the display 21. Therefore, if 1 is input by the ten-key set, 1 appears on the display as shown in FIG. 6(5). In summary, the one-touch-key number [nm] and the two-touch number (ij) are respectively treated as one number. This improves the serviceability of the machine.

We claim:

1. An automatic dialing machine adapted to a facsimile machine having a telephone function, comprising:
   display means for displaying an input number;
   memory means for memorizing a portion of a telephone number and a coded number corresponding to the portion of the telephone number;
   coded number input means for inputing the coded number;
   non-coded number input means for inputing a non-coded number;
   control means for displaying on the display means the coded number and the non-coded number in turn and in series as the coded number and the non-coded number are input respectively from the coded number input means and the non-coded number input means and for performing a real-phone-number-dialing based on a combination of the coded number and the non-coded number displayed on the display means; and
   cancellation for canceling the number displayed on the display means,
   wherein the cancellation means includes a cancel key and a cursor, and the number on the display is canceled when the cursor is placed below the first letter of the number to be canceled and the cancel key is pressed, and wherein the coded number is enclosed by brackets when it is displayed on the display means and the coded number is canceled when the cursor is placed below the first bracket and the cancel key is pressed.

2. The automatic dialing machine of claim 1, wherein the coded number input means comprises a one-touch speed dialing device and a two-touch speed dialing device.

3. The automatic dialing machine of claim 1, wherein the display means includes a first indicator and a second indicator provided above the first indicator and the first indicator displays a number input and the second indicator displays a message.

4. The automatic dialing machine of claim 1, further including an alarm which is activated when a non-registered coded number is input.

5. The automatic dialing machine of claim 1, further including an alarm which is activated when a number having digits larger than the capacity of the display means is input.

6. The automatic dialing machine of claim 1, wherein the non-coded number input means includes a ten-key set.

* * * * *